(12) United States Patent
Lee et al.

(10) Patent No.: US 11,855,316 B2
(45) Date of Patent: Dec. 26, 2023

(54) WATER DISCHARGE CONTROL SYSTEM AND METHOD FOR FUEL CELL

(71) Applicants: Hyundai Motor Company, Seoul (KR); Kia Motors Corporation, Seoul (KR)

(72) Inventors: Joon Yong Lee, Seoul (KR); Dong Hun Lee, Gyeonggi-do (KR); Soon Woo Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 177 days.

(21) Appl. No.: 16/539,553

(22) Filed: Aug. 13, 2019

(65) Prior Publication Data

US 2020/0303751 A1  Sep. 24, 2020

(30) Foreign Application Priority Data

Mar. 18, 2019  (KR) .......................... 10-2019-0030576

(51) Int. Cl.
| | |
|---|---|
| *H01M 8/04119* | (2016.01) |
| *H01M 8/0444* | (2016.01) |
| *H01M 8/04664* | (2016.01) |
| *H01M 8/04746* | (2016.01) |

(52) U.S. Cl.
CPC ... *H01M 8/04179* (2013.01); *H01M 8/04462* (2013.01); *H01M 8/04671* (2013.01); *H01M 8/04761* (2013.01)

(58) Field of Classification Search
CPC ......... H01M 8/04179; H01M 8/04671; H01M 8/04761; H01M 8/04462; H01M 8/04492; H01M 8/04231; H01M 8/04402; H01M 8/04388; H01M 8/04201; H01M 8/04753; H01M 8/04291; H01M 8/04097; Y02E 60/50
USPC ....................................................... 429/414
See application file for complete search history.

(56) References Cited

U.S. PATENT DOCUMENTS

| 5,925,476 A * | 7/1999 | Kawatsu | H01M 8/0267 429/444 |
|---|---|---|---|
| 2009/0087699 A1* | 4/2009 | Takemoto | H01M 8/04164 429/423 |
| 2014/0212779 A1* | 7/2014 | Furusawa | H01M 8/04197 429/429 |

(Continued)

FOREIGN PATENT DOCUMENTS

KR    100969063 B1    7/2010

*Primary Examiner* — Christian Roldan
(74) *Attorney, Agent, or Firm* — Fox Rothschild LLP

(57) ABSTRACT

A water discharge control system and method for a fuel cell are provided. The water discharge control system includes a fuel cell stack that generates power through an internal chemical reaction, a fuel supply line that recirculates fuel discharged from the fuel cell stack and supplies the fuel to the fuel cell stack, and a water trap that is disposed in the fuel supply line to store water generated in the fuel cell stack. A drain valve is disposed in an outlet port of the water trap to block discharge of the water stored in the water trap to the outside when closed. A drain controller determines whether fuel in the fuel supply line is being discharged through the outlet port when the drain valve is in an open state and closes the drain valve upon determining that fuel is being discharged.

4 Claims, 3 Drawing Sheets

(56) References Cited

U.S. PATENT DOCUMENTS

2017/0179511 A1* 6/2017 Jung ................. H01M 8/04589
2018/0294497 A1* 10/2018 Asai ....................... H01M 8/04

* cited by examiner

WATER DISCHARGE CONTROL SYSTEM AND METHOD FOR FUEL CELL

CROSS-REFERENCE TO RELATED APPLICATION

This application claims the priority benefit of Korean Patent Application No. 10-2019-0030576, filed on Mar. 18, 2019, the disclosure of which is incorporated herein by reference.

BACKGROUND

1. Field of the Invention

The present invention relates to a water discharge control system and method for a fuel cell, and more particularly, to a technology for blocking the discharge of hydrogen through a drain valve and estimating the concentration of hydrogen in a fuel supply line based on the amount of hydrogen discharged through the drain valve.

2. Description of the Related Art

A fuel cell is a type of power generation device that directly converts chemical energy, generated by oxidation of fuel, into electric energy. Like a chemical cell, a fuel cell uses oxidation and reduction reactions. However, unlike a chemical cell, in which a cell reaction occurs in a closed system, in a fuel cell, reactants are continuously supplied from the outside and a reaction product is continuously removed from the system to the outside. In recent years, a fuel-cell power generation system has been commercialized. Since the reaction product of a fuel cell is pure water, studies on the use of fuel cells as energy sources for environmentally friendly vehicles have been actively conducted.

A fuel cell system includes a fuel cell stack for generating electric energy through a chemical reaction, an air supply device that supplies air to an air electrode of the fuel cell stack, and a hydrogen supply device that supplies hydrogen to a hydrogen electrode of the fuel cell stack. When the fuel cell stack generates power, water is generated in the fuel cell stack, and a portion of the generated water passes through an electrolyte membrane due to a concentration difference and is discharged to the hydrogen electrode. The hydrogen supply device recirculates a hydrogen gas using a recirculation device, and the generated water discharged from the hydrogen electrode is condensed and is stored in a water trap included in the hydrogen supply device.

The water trap includes a water level sensor. When the level of the water sensed by the water level sensor is equal to or greater than a predetermined drain level, a drain valve is opened to discharge the stored water to the outside. When the level of the water sensed by the water level sensor is less than a predetermined blocking level, the drain valve is closed to block the leakage of hydrogen.

However, when the water level sensor of the water trap breaks down or malfunctions, it may be impossible to measure the level of the water stored in the water trap, and thus it may be impossible to appropriately control the drain valve. When the water in the hydrogen supply device is not discharged smoothly to the outside, the generated water may not be discharged from the fuel cell stack to the outside, and thus the flow passage in a separator may be blocked. On the other hand, if the drain valve is opened further than necessary, hydrogen may be undesirably discharged, and thus fuel efficiency may be deteriorated.

Conventionally, to solve this problem, when the water level sensor of the water trap breaks down or malfunctions, fail-safe control is performed such that, when the integrated current value obtained by integrating the current generated at the fuel cell stack reaches a predetermined value, the drain valve is opened. However, the amount of water to be stored in the water trap is not uniform based on the state of the fuel cell stack, which makes it impossible to accurately measure the water level in the water trap.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a control technology of blocking discharge of hydrogen through a drain valve even when a water level sensor of a water trap malfunctions and of considering the amount of hydrogen discharged through the drain valve when estimating the concentration of hydrogen in a fuel supply line.

In accordance with an aspect of the present invention, the above and other objects may be accomplished by the provision of a water discharge control system for a fuel cell, including a fuel cell stack configured to generate power through an internal chemical reaction, a fuel supply line configured to recirculate fuel discharged from the fuel cell stack and to supply the fuel to the fuel cell stack, a water trap disposed in the fuel supply line.

The water trap may be configured to store water generated in the fuel cell stack, a drain valve may be disposed in an outlet port of the water trap, and the drain valve may be configured to block discharge of the water stored in the water trap to the outside when closed. A drain controller may be configured to determine whether fuel in the fuel supply line is being discharged through the outlet port when the drain valve is in an open state and close the drain valve in response to determining that fuel is being discharged.

The water discharge control system may further include a fuel tank configured to store fuel therein, and a fuel supply valve disposed between the fuel tank and the fuel supply line. The fuel supply valve may be configured to adjust the amount of fuel to be supplied from the fuel tank to the fuel supply line. The drain controller may be configured to determine whether fuel is being discharged through the outlet port based on an output signal used to operate the fuel supply valve. The water discharge control system may further include a fuel supply controller configured to adjust the opening and closing of the fuel supply valve based on the pressure in the fuel supply line. The output signal used to operate the fuel supply valve may be output from the fuel supply controller. The water discharge control system may further include a concentration estimator configured to estimate the amount of fuel discharged to the outlet port by the opening of the drain valve and to estimate a concentration of the fuel in the fuel supply line based on the estimated amount of fuel discharged.

Additionally, the water discharge control system may include a purge valve disposed at a point at which the fuel supply line communicates with the outside. The purge valve may be configured to perform a purge control function of discharging gas in the fuel supply line to the outside by the opening and closing thereof. A purge controller may be configured to adjust the opening and closing of the purge valve based on the concentration of the fuel in the fuel supply line estimated by the concentration estimator. The water discharge control system may further include a water level sensor configured to sense the amount of water stored in the water trap. The drain controller may be configured to adjust the opening of the drain valve based on the amount of water stored in the water trap sensed by the water level sensor.

In accordance with another aspect of the present invention, a water discharge control method for a fuel cell may include opening a drain valve based on the amount of water stored in a water trap storing water in a fuel supply line configured to recirculate fuel to supply the fuel to a fuel cell stack, determining whether the fuel in the fuel supply line is being discharged to an outlet port of the water trap when the drain valve is open to allow discharge of the water, and to close the drain valve in response to determining that fuel is being discharged to the drain valve.

In the opening of the drain valve, the drain valve may be opened based on a value sensed by a water level sensor configured to sense the amount of water stored in the water trap. Additionally, in the opening of the drain valve, whether the fuel in the fuel supply line is being discharged to the outlet port of the water trap may be determined, and the drain valve may be opened based on a value sensed by the water level sensor in response to determining that fuel is not being discharged to the outlet port. In the determination of whether fuel is being discharged to the outlet port of the water trap, whether fuel is being discharged based on an output signal output from a fuel supply controller may be determined to adjust the opening and closing of a fuel supply valve configured to adjust the amount of fuel to be supplied from a fuel tank to the fuel supply line.

Additionally, in the determination of whether fuel is being discharged to the outlet port of the water trap fuel may be determined to have been discharged when the variation in the output signal output from the fuel supply controller is equal to or greater than a predetermined variation. The fuel may be determined to have been discharged when the difference between the output signal output from the fuel supply controller and an output signal reference value according to a previously mapped output signal map is equal to or greater than a predetermined error threshold.

In accordance with a further aspect of the present invention, a water discharge control method for a fuel cell may include determining whether fuel in a fuel supply line is being discharged to an outlet port of a water trap when a drain valve, which is disposed in the outlet port of the water trap storing water in the fuel supply line configured to recirculate fuel to supply the fuel to a fuel cell stack, is open, closing the drain valve in response to determining that fuel is being discharged to the drain valve, and estimating the amount of fuel discharged to the outlet port by the opening of the drain valve until the drain valve is closed.

In the estimating of the amount of fuel discharged, the amount of fuel discharged may be estimated on the assumption that fuel has been discharged through the outlet port from a time point of determination of discharge of the fuel to the drain valve to a time point of closing of the drain valve. The water discharge control method may further include, after estimating the amount of fuel discharged, estimating a concentration of the fuel in the fuel supply line based on the estimated amount of fuel discharged, and performing purge control of discharging gas in the fuel supply line to the outside by adjusting the opening and closing of a purge valve based on the estimated concentration of the fuel in the fuel supply line. In the estimating of the concentration of the fuel in the fuel supply line, the concentration of the fuel in the fuel supply line may be estimated in real time by applying the purge amount by the purge control, the discharge amount through the outlet port, and the crossover amount transmitted by an air supply line and diffusion to the initial concentration of the fuel in the fuel supply line.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
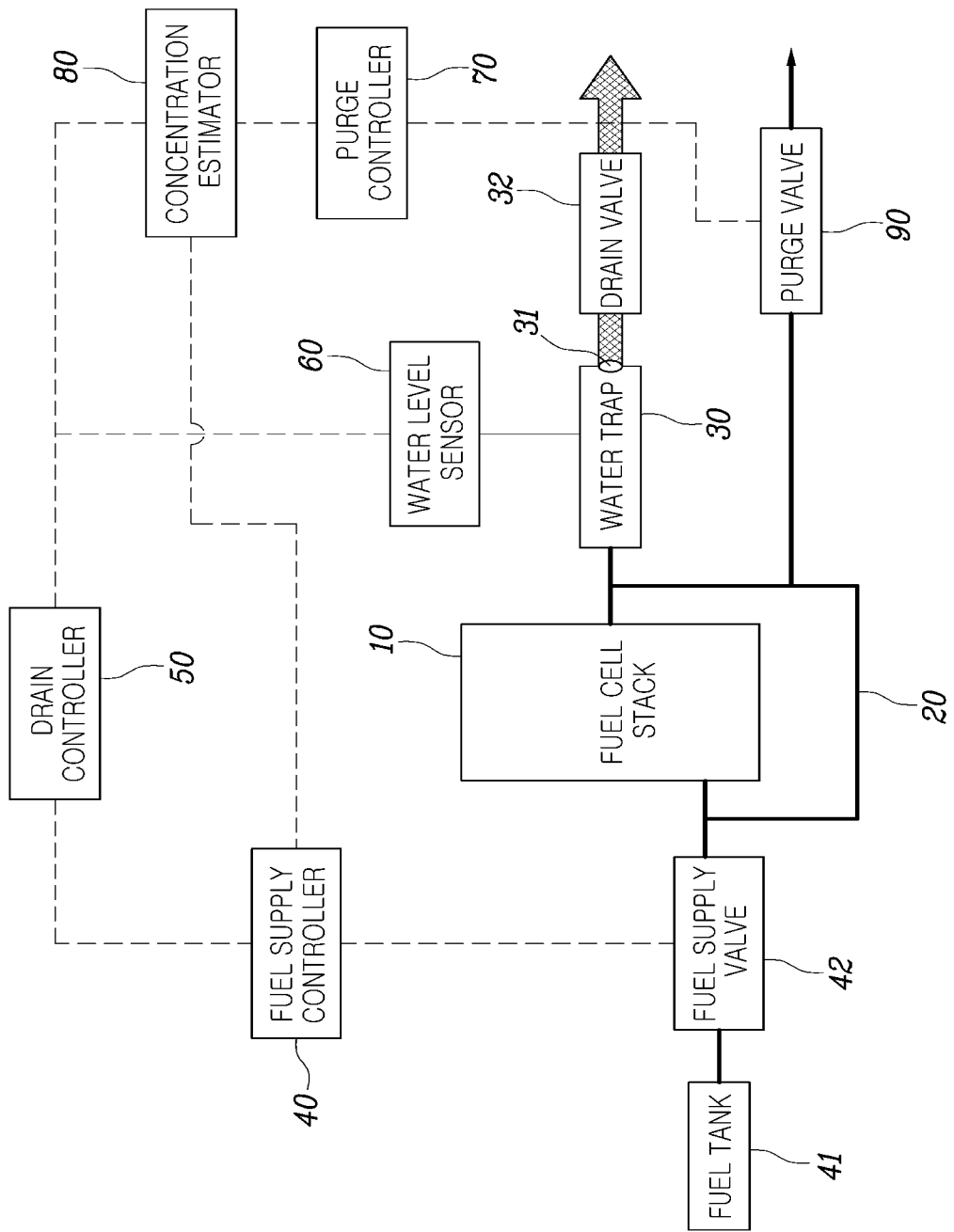
FIG. 1 is a view illustrating the construction of a water discharge control system for a fuel cell according to an exemplary embodiment of the present invention.

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternate forms and should not be construed as being limited only to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent" etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof, but do not preclude the presence or addition of one or more other features, integers, steps, operations, elements, components, and/or groups thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Reference will now be made in detail to the exemplary embodiments of the present invention, examples of which are illustrated in the accompanying drawings. Wherever possible, the same reference numbers will be used throughout the drawings to refer to the same or like parts.

FIG. 1 is a view illustrating the construction of a water discharge control system for a fuel cell according to an exemplary embodiment of the present invention. Referring to FIG. 1, a water discharge control system for a fuel cell according to an exemplary embodiment of the present invention may include a fuel cell stack 10, configured to generate power through an internal chemical reaction, a fuel supply line 20, which recirculates fuel discharged from the fuel cell stack 10 and supplies the fuel to the fuel cell stack 10, a water trap 30, that is disposed in the fuel supply line 20 and stores water generated in the fuel cell stack 10, a drain valve 32, that is disposed in an outlet port 31 of the water trap 30 and may be configured to block the discharge of the water stored in the water trap 30 to the outside when closed, and a drain controller 50, configured to determine whether the fuel in the fuel supply line 20 is being discharged through the outlet port 31 when the drain valve 32 is in an open state and to close the drain valve 32 in response to determining that fuel is being discharged.

The fuel cell stack 10 may receive hydrogen and oxygen, which are fuel elements, through a hydrogen electrode (anode) and an oxygen electrode (cathode), and generate power through a chemical reaction therebetween. When hydrogen and oxygen react in the fuel cell stack 10, water is generated. The fuel supply line 20 may be configured to supply the fuel supplied from the fuel tank 41 to the fuel cell stack 10, recirculate the fuel discharged from the fuel cell stack 10, and again supply the fuel to the fuel cell stack 10. In other words, the fuel discharged from the fuel cell stack 10 may be recirculated and mixed with the fuel supplied from the fuel tank 41, and the mixture may be supplied again to the fuel cell stack 10.

The water trap 30 may be disposed in the fuel supply line 20 and may store water generated in the fuel cell stack 10. In particular, the water trap 30 may store the water, generated at the oxygen electrode of the fuel cell stack 10 and moved to the fuel supply line 20 while being diffused to the hydrogen electrode of the fuel cell stack 10. The outlet port 31 of the water trap 30 may be connected to the outside, or may be connected to a humidifier disposed in the entrance of the air electrode of the fuel cell stack 10.

The drain valve 32 may be disposed in the outlet port 31 of the water trap 30 to adjust the discharge of the water from the water trap 30. In particular, the drain valve 32 may allow the discharge of the water stored in the water trap 30 when opened, and may block the discharge of the water when closed. The drain valve 32 may be operated to be closed to prevent hydrogen from being discharged through the outlet port 31 of the water trap 30 at normal times, and may be operated to be intermittently opened to discharge the stored water to the outside.

Conventionally, the opening and closing of the drain valve 32 is adjusted using the water level sensor 60 configured to sense the amount of water stored in the water trap 30. Specifically, when the stored amount of water sensed by the water level sensor 60 is equal to or greater than a predetermined upper-limit value, the drain valve 32 is opened, and when the stored amount of water sensed by the water level sensor 60 is less than a predetermined lower-limit value, the drain valve 32 is closed. However, the water level sensor 60 frequently performs erroneous operation, and thus has low sensing accuracy. Further, even when the water is completely discharged, the drain valve 32 is maintained in an open state due to slow responsiveness of the water level sensor 60, and thus hydrogen is discharged through the outlet port 31.

Accordingly, in the event of erroneous operation of the water level sensor 60, whenever the integrated current value, obtained by integrating the current output from the fuel cell, reaches a predetermined value, the drain valve 32 is opened, and is closed after being maintained in an open state for a predetermined open time period. However, the opening and closing of the drain valve 32 is adjusted without considering the amount of water stored in the water trap 30, which may cause discharge of hydrogen or flooding of the fuel cell stack 10.

The drain controller 50 according to an exemplary embodiment of the present invention may be configured to determine whether the fuel in the fuel supply line 20 is being discharged through the outlet port 31 when the drain valve 32 is open, and to close the drain valve 32 in response to determining that fuel is being discharged. In other words, in response to determining that hydrogen is being discharged through the outlet port 31 when the drain valve 32 is open, the drain controller 50 may be configured to immediately close the drain valve 32 to prevent the discharge of hydrogen. This control process may be applied together with the opening/closing operation of the drain valve 32 based on the amount of water stored in the water trap 30, which is sensed by the water level sensor 60. Thus, it may be possible to prevent excessive discharge of hydrogen due to slow responsiveness of the water level sensor 60 and to effectively discharge the water from the water trap 30.

The water discharge control system for a fuel cell according to the exemplary embodiment of the present invention may further include a fuel tank 41 in which fuel may be stored, and a fuel supply valve 42 disposed between the fuel tank 41 and the fuel supply line 20 and configured to adjust the amount of fuel to be supplied from the fuel tank 41 to the fuel supply line 20. The drain controller 50 may be configured to determine whether fuel is being discharged through the outlet port 31 based on an output signal for operating the fuel supply valve 42.

The fuel tank 41 may store high-pressure hydrogen therein, and may supply the stored hydrogen to the fuel supply line 20 via the fuel supply valve 42. In particular, the high-pressure hydrogen stored in the fuel tank 41 may undergo a depressurizing process, and may then be supplied to the fuel supply line 20. The water discharge control system for a fuel cell according to the exemplary embodiment of the present invention may further include a fuel supply controller 40 configured to execute the opening and closing of the fuel supply valve 42 based on the pressure in the fuel supply line 20. The fuel supply controller 40 may be configured to output an output signal for operating the fuel supply valve 42.

Additionally, the fuel supply controller 40 may be configured to execute the opening and closing of the fuel supply valve 42 based on a target pressure of the fuel supply line 20 and a pressure and a temperature in the fuel supply line 20. In other words, the output signal for operating the fuel supply valve 42 may be set based on the target pressure of the fuel supply line 20 and the pressure and the temperature in the fuel supply line 20. The water discharge control system for a fuel cell according to the exemplary embodiment of the present invention may further include a concentration estimator 80 configured to estimate the amount of fuel discharged to the outlet port 31 by the opening of the drain valve 32 and estimate the concentration of the fuel in the fuel supply line 20 based on the estimated amount of fuel discharged.

The concentration estimator 80 may be configured to estimate the concentration of the fuel in the fuel supply line 20 in real time by applying the purge amount by the purge control, the discharge amount through the outlet port 31, and the crossover amount transmitted by the air supply line and diffusion to the initial concentration of the fuel in the fuel supply line 20, which will be described in detail later. In particular, the amount of fuel discharged through the outlet port 31 of the water trap 30 may be considered when estimating the concentration of the fuel in the fuel supply line 20, thereby improving the accuracy of concentration estimation and consequently more accurately adjusting the concentration of the fuel in the fuel supply line 20.

The water discharge control system for a fuel cell according to the exemplary embodiment of the present invention may further include a purge valve 90, disposed at a point at which the fuel supply line 20 communicates with the outside and may be configured to perform a purge control function of discharging gas in the fuel supply line 20 to the outside by the opening and closing thereof, and a purge controller 70, configured to execute the opening and closing of the purge valve 90 based on the concentration of the fuel in the fuel supply line 20, which is estimated by the concentration estimator 80.

The gas in the fuel supply line 20 may be discharged to the outside under the purge operation of opening the purge valve 90, and thus the concentration of the fuel in the fuel supply line 20 may increase. When the concentration of the fuel in the fuel supply line 20, estimated by the concentration estimator 80, becomes equal to or less than a predetermined value, the purge controller 70 may be configured to execute the opening and closing of the purge valve 90.

Thus, even when a portion of the fuel is discharged through the outlet port 31 of the water trap, the concentration estimator 80 may be configured to estimate the concentration of the fuel in the fuel supply line 20 based on the amount of fuel discharged, and the purge control may be performed based on the estimated concentration of the fuel. Accordingly, a purge control period may be further increased, thus having no adverse effect on the amount of fuel discharged or on fuel efficiency. In addition, since the concentration of the fuel in the fuel supply line 20 may be adjusted more accurately, it may be possible to prevent the concentration of the fuel in the fuel supply line 20 from being increased higher than necessary, thereby improving fuel efficiency.

The water discharge control system for a fuel cell according to the exemplary embodiment of the present invention may further include a water level sensor 60 configured to sense the amount of water stored in the water trap 30. The drain controller 50 may be configured to open the drain valve 32 based on the amount of water stored in the water trap, which is sensed by the water level sensor 60.

In other words, the drain controller 50 may be configured to open the drain valve 32 based on the storage amount of the water sensed by the water level sensor 60. For example, when the storage amount of the water sensed by the water level sensor 60 is equal to or greater than a predetermined upper-limit value, the drain controller 50 may be configured to open the drain valve 32. When the drain valve 32 is open, in response to determining that fuel is being discharged through the outlet port 31, the drain controller 50 may be configured to close the drain valve 32.

In addition, when the storage amount of the water sensed by the water level sensor 60 is equal to or less than a predetermined lower-limit value or in response determining that fuel is being discharged through the outlet port 31 by the opening of the drain valve 32, the drain controller 50 may be configured to close the drain valve 32. Particularly, the drain controller 50, the fuel supply controller 40, the concentration estimator 80 and the purge controller 70 may be separately provided controllers, may be controllers configured to operate a hydrogen supply system of a fuel cell, or may be included in a fuel cell control unit (FCU) configured to operate a hydrogen supply system of a fuel cell.

The drain controller 50, the fuel supply controller 40, the concentration estimator 80 and the purge controller 70 according to the exemplary embodiment of the present invention may be implemented through a processor (not illustrated) configured to execute the operation to be described below using a nonvolatile memory (not illustrated), which is configured to store an algorithm for executing the operation of various components of a vehicle or data related to a software command for executing the algorithm, and data stored in the corresponding memory. Particularly, the memory and the processor may be implemented as individual chips. Alternatively, the memory and the processor may be may be implemented as a single integrated chip. The processor may alternatively take the form of one or more processors.

Figure 2:
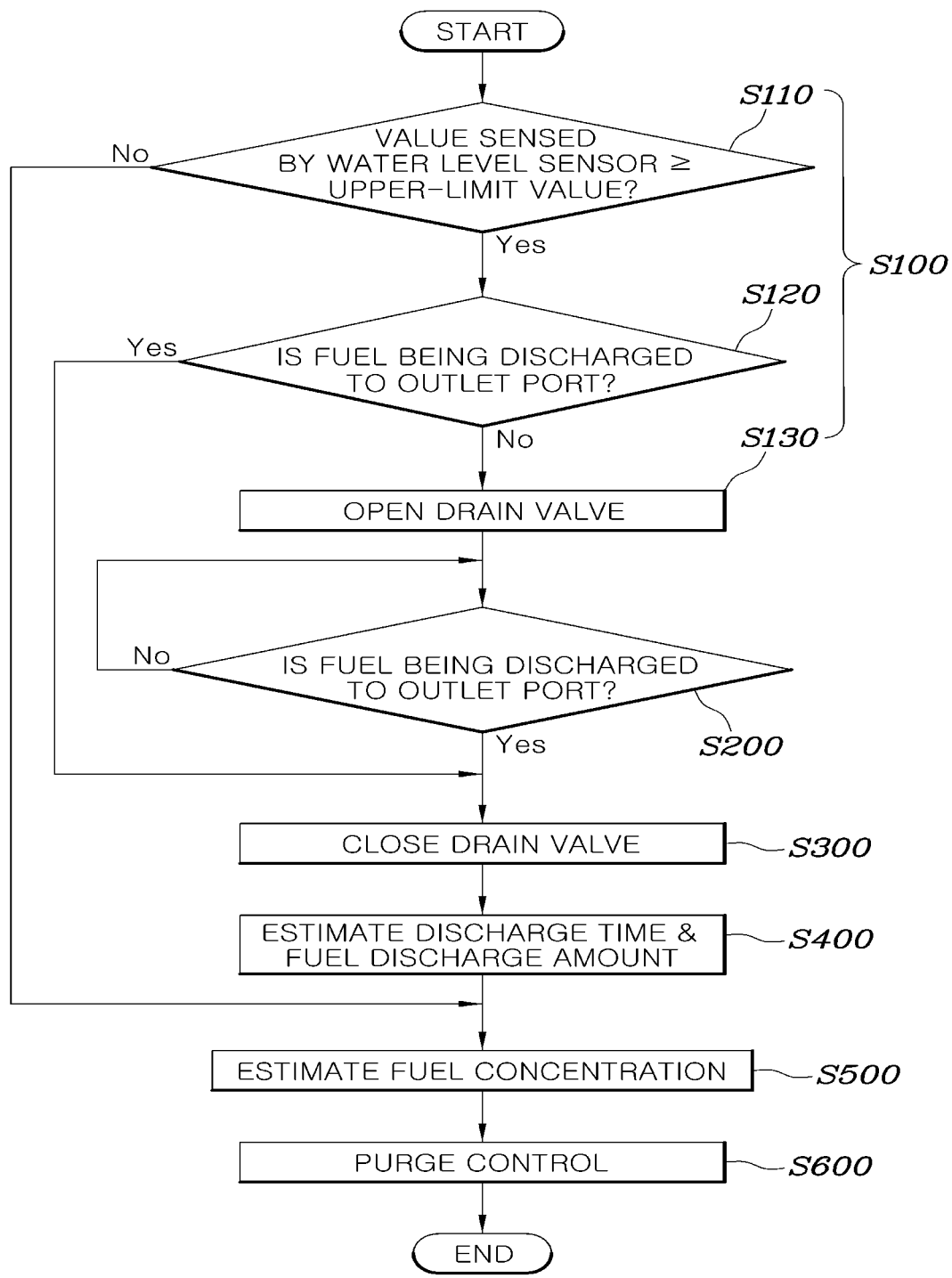
FIG. 2 is a flowchart of a water discharge control method for a fuel cell according to an exemplary embodiment of the present invention.

FIG. 2 is a flowchart of a water discharge control method for a fuel cell according to an exemplary embodiment of the present invention. The method described herein below may be executed by an overall controller. Referring to FIG. 2, a water discharge control method for a fuel cell according to an exemplary embodiment of the present invention may include opening the drain valve 32 based on the amount of water stored in the water trap 30, which stores water in the fuel supply line 20 for recirculating the fuel to supply the fuel to the fuel cell stack 10 (S100), determining whether the fuel in the fuel supply line 20 is being discharged to the outlet port 31 of the water trap 30 when the drain valve 32 is open in order to allow discharge of the water (S200), and closing the drain valve 32 in response to determining that fuel is being discharged to the drain valve 32 (S300).

Thus, it may be possible to efficiently discharge the water while minimizing the discharge of the fuel through the outlet port 31 by determining whether the discharge of the water through the outlet port 31 of the water trap 30 has been completed and whether fuel is being discharged and by immediately closing the drain valve 32. In the opening of the drain valve 32 (S100), based on the value sensed by the water level sensor 60 sensing the amount of water stored in the water trap 30 (S110), the drain valve 32 may be opened (S130).

For example, in response to determining that the storage amount of the water sensed by the water level sensor 60 is equal to or greater than a predetermined upper-limit value (S110) and when this state is maintained for a predetermined sensing time period, the drain valve 32 may be opened (S130). Since the opening control of the drain valve 32 is not necessarily performed immediately, the opening control of the drain valve 32 may be performed using the water level sensor 60, the responsiveness of which is slow.

In addition, in the opening of the drain valve 32 (S100), whether the fuel in the fuel supply line 20 is being discharged to the outlet port 31 of the water trap 30 may be determined (S120), and the drain valve 32 may be opened based on the value sensed by the water level sensor 60 in response to determining that fuel is not being discharged to the outlet port 31 (S130).

In other words, even when the value sensed by the water level sensor 60 meets the requirement for opening the drain valve 32, in response to determining that the fuel in the fuel supply line 20 is discharged to the outlet port 31 of the water trap 30 (S120), the drain valve 32 may not be opened (e.g., may remain closed). In particular, the drain valve 32 may not be completely closed but may be in an open state, and thus the drain valve 32 may be closed again (S300).

Figure 3:
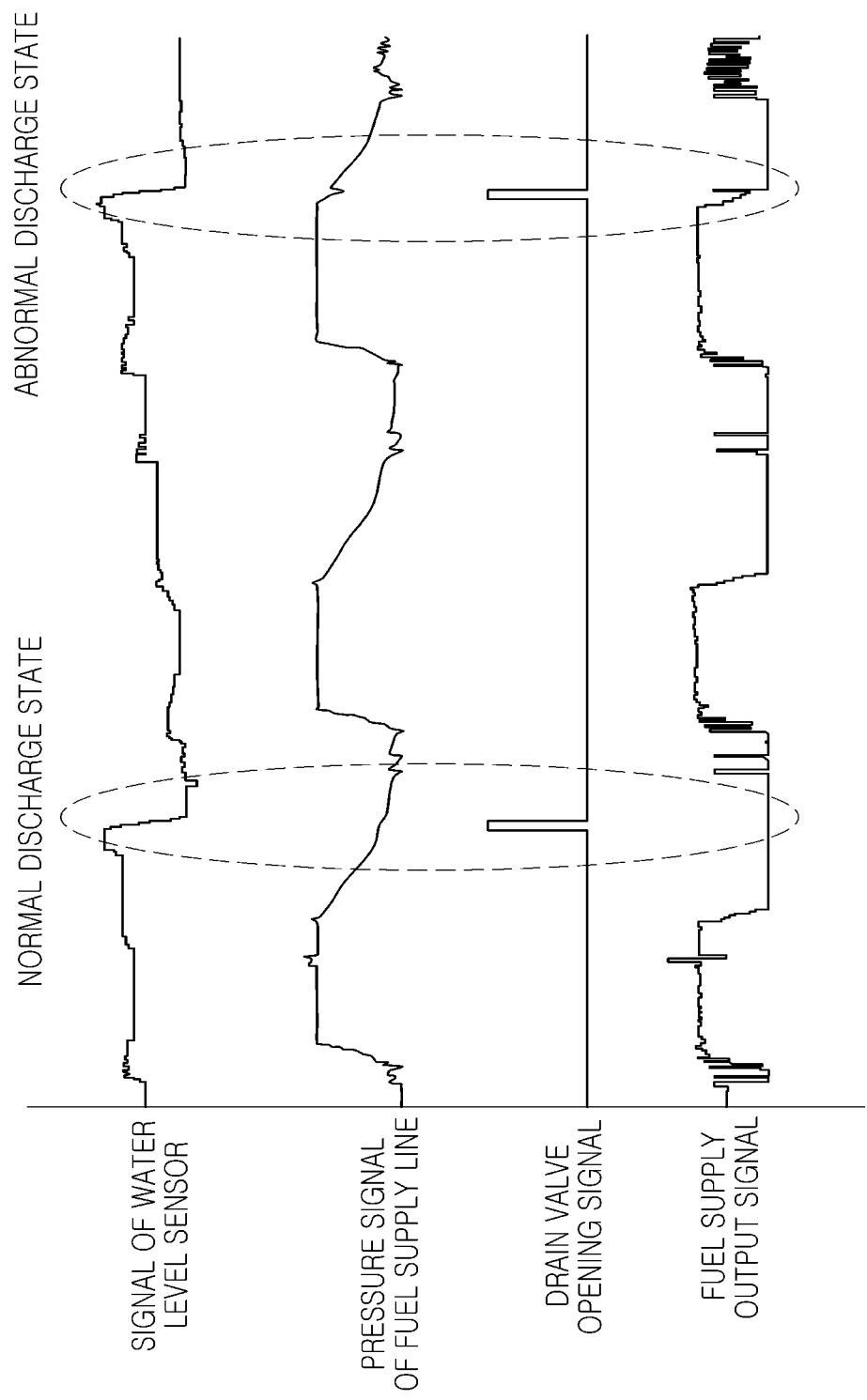
FIG. 3 is a view illustrating signals in a state of normal water discharge and in a state of abnormal water discharge according to an exemplary embodiment of the present invention.

FIG. 3 is a view illustrating signals in a state of normal water discharge and in a state of abnormal water discharge. Referring to FIG. 3, in the state of normal water discharge, the water level sensor 60 may be configured to sense the amount of water stored in the water trap 30, and the drain valve 32 may be opened to discharge only the water through the outlet port 31. Thus, since the fuel in the fuel supply line 20 is not discharged, the pressure signal of the fuel supply line 20 and the fuel supply output signal do not vary, but only the signal of the water level sensor 60 varies.

However, in the state of abnormal water discharge, the fuel in the fuel supply line 20 as well as the water may be discharged through the outlet port 31, and thus the pressure signal of the fuel supply line 20 and the fuel supply output signal vary. Since the variation in the pressure signal of the fuel supply line 20 is minimal, it may be difficult to determine whether fuel is being discharged through the outlet port 31. However, since the variation in the fuel supply output signal is substantial, whether fuel is being discharged may be determined more rapidly and accurately.

In the determination of whether fuel is being discharged to the outlet port 31 of the water trap 30 (S200), whether fuel is being discharged may be determined based on the output signal output from the fuel supply controller 40 to execute the opening and closing of the fuel supply valve 42 for adjusting the amount of fuel to be supplied from the fuel tank 41 to the fuel supply line 20. The output signal output from the fuel supply controller 40 may be a control signal for executing the opening and closing of the fuel supply valve 42. Specifically, the fuel supply controller 40 may be configured to adjust the pressure in the fuel supply line 20 by opening and closing the fuel supply valve 42 based on the target pressure of the fuel supply line 20 and the pressure and the temperature in the fuel supply line 20.

In one exemplary embodiment, in the determination of whether fuel is being discharged to the outlet port 31 of the water trap 30, fuel may be determined to have been discharged when the variation in the output signal output from the fuel supply controller 40 is equal to or greater than a predetermined variation. When the variation over time in the output signal from the fuel supply controller 40 exceeds the predetermined variation, the pressure in the fuel supply line 20 may be determined to have changed substantially, and thus the fuel may be determined to have been discharged through the outlet port 31.

In another exemplary embodiment, in the determination of whether fuel is being discharged to the outlet port 31 of the water trap 30, fuel may be determined to have been discharged when the difference between the output signal output from the fuel supply controller 40 and an output signal reference value according to a previously mapped output signal map is equal to or greater than a predetermined error threshold.

An output signal reference value based on the target pressure of the fuel supply line 20 and the temperature in the fuel supply line 20 may be stored in advance in the previously mapped output signal map. When the difference between the output signal from the fuel supply controller 40 and the output signal reference value according to the previously mapped output signal map is equal to or greater than a predetermined error threshold, the pressure in the fuel supply line 20 may be determined to have changed substantially, and thus fuel may be determined to have been discharged through the outlet port 31. In still another exemplary embodiment, fuel may be determined to have been discharged at an inflection point, i.e. a peak point, to which the output signal output from the fuel supply controller 40 increases after decreasing.

The water discharge control method for a fuel cell according to an exemplary embodiment of the present invention may include determining whether the fuel in the fuel supply line 20 is being discharged to the outlet port 31 of the water trap 30 when the drain valve 32, which is disposed in the outlet port 31 of the water trap 30 storing water in the fuel supply line 20 for recirculating the fuel to supply the fuel to the fuel cell stack 10, is open (S200), closing the drain valve 32 in response to determining that fuel is being discharged to the drain valve 32 (S300), and estimating the amount of fuel discharged to the outlet port 31 by the opening of the drain valve 32 until the drain valve 32 is closed (S400).

In other words, the water discharge control method for a fuel cell according to an exemplary embodiment of the present invention may further include, after closing the drain valve 32 (S300), estimating the amount of fuel discharged to the outlet port 31 by the opening of the drain valve 32 until the drain valve 32 is closed (S400).

Specifically, in the estimating of the amount of fuel discharged (S400), the amount of fuel discharged may be estimated on the assumption that fuel has been discharged through the outlet port 31 from the time point of determination of the discharge of the fuel to the drain valve 32 to the time point of the closing of the drain valve 32. In particular, the amount of fuel discharged may be estimated by multiplying the discharge rate over time by a discharge time (e.g., from the time point of determination of the discharge of the fuel to the time point of the closing of the drain valve 32).

The water discharge control method for a fuel cell according to an exemplary embodiment of the present invention may further include, after estimating the amount of fuel discharged (S400), estimating the concentration of the fuel in the fuel supply line 20 based on the estimated amount of fuel discharged (S500), and performing purge control of discharging gas in the fuel supply line 20 to the outside by opening and closing the purge valve 90 based on the estimated concentration of the fuel in the fuel supply line 20 (S600).

In the estimation of the concentration of the fuel in the fuel supply line 20 (S500), the concentration of the fuel in the fuel supply line 20 may be estimated in real time by applying the purge amount by the purge control, the discharge amount through the outlet port 31, and the crossover amount transmitted by the air supply line and diffusion to the initial concentration of the fuel in the fuel supply line 20. Specifically, the concentration of the fuel in the fuel supply line 20 may be estimated using the following equation, on the assumption that only nitrogen, hydrogen and vapor are present with a uniform concentration in the fuel supply line 20.

$$n_{H2}/n_{An} = 1 - n_{N2}/n_{An} - n_v/n_{An}$$

wherein $n_{An}$ represents the total amount of gas present in the fuel supply line 20, nN2 represents the amount of nitrogen, nv represents the amount of vapor, and nH2 represents the amount of hydrogen.

The concentration of the fuel in the fuel supply line 20 may be estimated by applying the amount of nitrogen and the amount of vapor introduced through crossover, the amount of hydrogen discharged through crossover and the purge amount and the discharge amount discharged to the outside to the initial concentration of the fuel in the fuel supply line 20. The total amount of gas $n_{An}$ in the fuel supply line 20 may be estimated based on the pressure P, the volume V and the temperature T in the fuel supply line 20 using the following ideal gas equation.

$$n_{An} = P_{An}V_{An}/RT \text{ [mol]}$$

wherein R represents the gas constant of 8.314 [J/mol·K].

The amount of nitrogen and the amount of vapor may be estimated by integrating the value (=amount of nitrogen/amount of vapor introduced through crossover−amount of nitrogen/amount of vapor by purge−amount of nitrogen/amount of vapor discharged through outlet port 31) over time and adding the integrated value to the initial amount of nitrogen and the initial amount of vapor.

$$n_v = n_{v\_init} + \int (\dot{n}_{V\_xo} - \dot{n}_{V\_purge} - \dot{n}_{V\_drain})dt$$

$$n_{N_2} = n_{N_2\_init} + \int (\dot{n}_{N_2\_XO} - \dot{n}_{N_2\_purge} - \dot{n}_{N_2\_drain})dt$$

When the operation of the fuel cell is restarted after being stopped, the initial amount of nitrogen or the initial amount of vapor may be estimated using the previously generated map based on the operation stop time. Specifically, the crossover amount of gas may be calculated using the following Fick's Law of Diffusion. The diffusion rate of gas may be inversely proportional to the thickness of an electrolyte membrane of the fuel cell stack 10 and may be proportional to the difference in the gas partial pressure between the anode and the cathode.

$$\frac{\dot{m}}{A} = -D\frac{\partial c}{\partial x} = -D\frac{M}{RT}\frac{\partial P}{\partial x}$$

wherein ṁ represents the mass diffusion rate (g/s) of gas, A represents the diffusion area, D represents the diffusion coefficient of gas, x represents the diffusion distance, c represents the concentration of gas, R represents the universal gas constant of 8.314 [J/mol·K], P represents the pressure of gas, T represents the temperature of gas, and M represents the molar mass (g/mol) of gas. These factors may be expressed using the following equations.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

wherein ṅ represents the diffusion rate (mol/s) of gas.

In other words, the crossover amount of gas through the electrolyte membrane of the fuel cell stack 10 may be calculated using the following equation.

$$\dot{n}_{N2\_xo} = \frac{D_{N2}}{RT}\frac{P_{Ca,N2} - P_{An,N2}}{\delta}A$$

wherein $\dot{n}_{N2\_xo}$ represents the diffusion rate of nitrogen, P represents the pressure [kPa], R represents the gas constant of 8.314 [J/mol·K], T represents the temperature [K], D represents the diffusion coefficient, A represents the area of the electrolyte membrane, S represents the thickness of the electrolyte membrane, $P_{Ca,N2}$ represents the nitrogen partial pressure at the cathode side of the fuel cell, and $P_{An,N2}$ represents the nitrogen partial pressure at the anode side of the fuel cell.

$$\dot{n}_{V\_xo} = \frac{D_V}{RT}\frac{P_{Ca,V} - P_{An,V}}{\delta}A$$

wherein $\dot{n}_{V\_xo}$ represents the diffusion rate of vapor, P represents the pressure [kPa], R represents the gas constant of 8.314 [J/mol·K], T represents the temperature [K], D represents the diffusion coefficient, A represents the area of the electrolyte membrane, δ represents the thickness of the electrolyte membrane, $P_{CA,V}$ represents the vapor partial pressure at the cathode side of the fuel cell, and $P_{An,N2}$ represents the vapor partial pressure at the anode side of the fuel cell.

Unlike nitrogen and vapor, hydrogen crosses over from the anode of the fuel cell to the cathode of the fuel cell.

$$\dot{n}_{H2\_xo} = \frac{D_{H2}}{RT}\frac{P_{An,H2} - P_{Ca,H2}}{\delta}A$$

wherein $\dot{n}_{H2\_xo}$ represents the diffusion rate of hydrogen, P represents the pressure [kPa], R represents the gas constant of 8.314 [J/mol·K], T represents the temperature [K], D represents the diffusion coefficient, A represents the area of the electrolyte membrane, S represents the thickness of the electrolyte membrane, $P_{An,H2}$ represents the hydrogen partial pressure at the anode side, and $P_{Ca,H2}$ represents the hydrogen partial pressure at the cathode side.

The diffusion rate of gas may be proportional to the diffusion coefficient of gas, and the diffusion coefficient of gas may vary based on the water content and the temperature of the electrolyte membrane, which is disposed between the anode and the cathode of the fuel cell.

The diffusion coefficient D of gas may be a fixed constant value. Alternatively, to increase accuracy, the diffusion coefficient D of gas may be a value that varies based on degradation or the temperature of the fuel cell. In particular, the diffusion coefficient D of gas may be calculated using a value that varies based on the water content and the temperature of the electrolyte membrane, disposed between the anode and the cathode of the fuel cell. In addition, the diffusion coefficient D of gas may be calculated using a value that varies based on the degradation of the electrolyte membrane of the fuel cell stack 10.

The purge amount may be estimated by integrating the purge rate over time, or may be calculated by multiplying the purge rate by the purge time. In particular, the purge amount of each gas may be calculated by multiplying the overall purge amount by the concentration of each gas in the fuel supply line 20.

The purge rate $n_{purge}$ may be proportional to the difference between the pressure $P_{An}$ of gas at the anode side and the pressure $P_{out}$ of external gas. The pressure $P_{out}$ of external gas may be the pressure of gas at the cathode side. These factors may be expressed using the following equation.

$$n_{purge} = C(P_{An} - P_{out})$$

wherein C represents the purge gain value, which may be set based on the degree of opening of the purge valve 90.

The discharge rate may be proportional to the differential pressure between the fuel supply line 20 and the outside, and may be multiplied by a discharge gain as a proportional constant, as expressed using the following equation. The discharge gain may be proportional to the diameter or the area of the outlet port 31 of the water trap 30.

$$\dot{n}_{arein} = Ca(P_{An} - P_{stk\_out})$$

wherein $\dot{n}_{arein}$ represents the discharge rate, Cd represents the discharge gain, PAn represents the pressure in the fuel supply line 20, and $P_{stk\_out}$ represents the external pressure.

The discharge amount may be estimated by integrating the discharge rate over time, or may be calculated by multiplying the discharge rate by the discharge time. The discharge amount of each gas may be calculated by multiplying the overall discharge amount by the concentration of each gas in the fuel supply line 20.

Accordingly, it may be possible to more accurately estimate the concentration of hydrogen. Thus, unnecessary purging may be prevented, and purge control may be performed such that the concentration of the fuel in the fuel supply line 20 may be maintained more accurately. As a result, fuel efficiency may be increased, and the durability of the fuel cell stack 10 may be improved.

As is apparent from the above description, according to a water discharge control system and method for a fuel cell of the present invention, it may be possible to minimize the discharge of hydrogen to an outlet port of a water trap due to inaccuracy and slow responsiveness of a water level sensor. In addition, as a result of more accurately estimating the concentration of fuel in a fuel supply line and utilizing the estimated concentration of fuel for purge control, the accuracy of control of the concentration of the fuel in the fuel supply line may be improved, unnecessary purge control may be prevented, and fuel efficiency may be increased.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A water discharge control method for a fuel cell, comprising:
   opening, by a controller, a drain valve based on an amount of water stored in a water trap storing water in a fuel supply line configured to recirculate fuel to supply the fuel to a fuel cell stack, wherein the drain valve is disposed in an outlet of the water trap;
   determining, by the controller, whether fuel in the fuel supply line is being discharged to an outlet port of the water trap when the drain valve is open to allow discharge of the water;
   closing, by the controller, the drain valve to prevent discharge of fuel in response to determining that fuel is being discharged to the drain valve;
   estimating, by the controller, an amount of fuel discharged to the outlet port by opening of the drain valve until the drain valve is closed;
   estimating, by the controller in real-time, a concentration of the fuel in the fuel supply line based on a purge amount of fuel discharged from the fuel supply line to an outside, the estimated amount of fuel discharged through the outlet port, and a crossover amount transmitted by an air supply line and diffusion to an initial concentration of the fuel in the fuel supply line;
   determining, by the controller, whether fuel is being discharged based on an output signal from a fuel supply controller configured to open and close a fuel supply valve to adjust an amount of fuel to be supplied from a fuel tank to the fuel supply line; and
   determining, by the controller, that fuel has been discharged when a difference between the output signal from the fuel supply controller and an output signal reference value based on a previously generated output signal map is equal to or greater than a predetermined error threshold,
   wherein the output signal reference value based on a target pressure of the fuel supply line and a temperature in the fuel supply line is stored in advance in the previously generated output signal map.

2. The water discharge control method according to claim 1, further comprising:
   opening, by the controller, the drain valve based on a value sensed by a water level sensor configured to sense the amount of water stored in the water trap.

3. The water discharge control method according to claim 2, further comprising:
   determining, by the controller, whether the fuel in the fuel supply line is being discharged to the outlet port of the water trap; and
   opening, by the controller, the drain valve based on a value sensed by the water level sensor in response to determining that fuel is not being discharged to the outlet port.

4. The water discharge control method according to claim 1, further comprising:

determining, by the controller, that fuel has been discharged when a variation in the output signal from the fuel supply controller is equal to or greater than a predetermined variation.

\* \* \* \* \*